US012132776B2

(12) United States Patent
Gizis et al.

(10) Patent No.: US 12,132,776 B2
(45) Date of Patent: Oct. 29, 2024

(54) MULTI-PARTY CONFERENCE DATA MANAGEMENT

(71) Applicant: Connectify, Inc., Philadelphia, PA (US)

(72) Inventors: Alexander Gizis, Philadelphia, PA (US); Brian Prodoehl, Plymouth Meeting, PA (US); Kevin Cunningham, Swarthmore, PA (US)

(73) Assignee: CONNECTIFY, INC., Philadelphia, PA (US)

( * ) Notice: Subject to any disclaimer, the term of this patent is extended or adjusted under 35 U.S.C. 154(b) by 0 days.

(21) Appl. No.: 18/320,194

(22) Filed: May 18, 2023

(65) Prior Publication Data

US 2023/0379377 A1 Nov. 23, 2023

Related U.S. Application Data

(60) Provisional application No. 63/343,973, filed on May 19, 2022.

(51) Int. Cl.
*H04L 65/1083* (2022.01)
*H04L 65/80* (2022.01)
*H04L 12/46* (2006.01)

(52) U.S. Cl.
CPC .......... *H04L 65/80* (2013.01); *H04L 65/1086* (2013.01); *H04L 12/4641* (2013.01)

(58) Field of Classification Search
CPC ............. H04L 12/4633; H04L 12/4641; H04L 12/2856; H04L 65/1086; H04L 65/80; H04L 63/0464; H04L 63/10; H04L 63/20; H04L 67/56; G06N 20/00
See application file for complete search history.

(56) References Cited

U.S. PATENT DOCUMENTS

| 2015/0271141 | A1* | 9/2015 | Kumar | H04L 63/10 726/15 |
| 2019/0173849 | A1* | 6/2019 | Lapidous | H04L 67/56 |
| 2020/0396279 | A1* | 12/2020 | Vysotsky | H04L 63/20 |
| 2021/0227029 | A1* | 7/2021 | Harter | H04L 12/2856 |
| 2021/0320871 | A1* | 10/2021 | Savarese | G06N 20/00 |
| 2021/0392076 | A1* | 12/2021 | Prodoehl | H04L 12/4641 |
| 2022/0337480 | A1* | 10/2022 | Vanajakshi | H04L 12/4641 |
| 2023/0269160 | A1* | 8/2023 | Mineikis | H04L 63/0464 |

* cited by examiner

*Primary Examiner* — Le H Luu
(74) *Attorney, Agent, or Firm* — Kamran Emdadi

(57) ABSTRACT

One example process may include determining, via a virtual private network (VPN) server, one or more client devices are currently content sharing during a conference including a plurality of active client devices, monitoring, via the VPN server, communication session parameters of one or more of the client devices which are forwarding the shared content to the VPN server, and the shared content is destined for one or more of the other client devices, modifying, via the VPN server, one or more of the communication session parameters of the one or more client devices which are forwarding the shared content to the VPN server, and determining whether the modified one or more communication session parameters have increased a performance of the one or more other client devices.

20 Claims, 12 Drawing Sheets

MULTI-PARTY CONFERENCE DATA MANAGEMENT

TECHNICAL FIELD

This application relates to conference management, and more specifically to managing data flow during a conference.

BACKGROUND

Conventionally, a conference call or conference bridge application which operates over the Internet provides limited reliability to the conference participants. Applications which cause data to be sent and received across the Internet may be limited to data management activities which are only performed for each individual data stream of each individual user/client device. Each user/client device has its own Internet access service, such as an Internet service provider (ISP) which provides. Applications that include collaboration among multiple client devices, such as gaming, point-to-point information sharing, conferencing, etc., or similar types of services may include multiple different data sessions that cause the application, operating on a remote application server and the client devices to experience data mismanagement which can cause delays, quality concerns and other limitations. The ISPs used by most client devices do not provide advanced data management strategies to ensure low latency and added resources necessary to reduce delays and ensure quality for real-time and near real-time data transfers.

Each client device operating with an active conference application may or may not be using a third party data service provider beyond a basic Internet service provider for data routing and management purposes. An ISP will manage data traffic being transferred to and from a client device at an office or home location and the routing strategies may include using routing tables or other protocol specific Internet based routing techniques to link the client device to a particular server. Real-time data, such as live video and audio data packets may be treated by the ISP like any other data stream, there are generally no added measures used to optimize data, if anything, the ISP will take preventive measures to reduce bandwidth and other data minimizing strategies to prevent client devices from using too much data over a short period of time. One strategy may be application based, for example, GOOGLE 'meet' may be an application that is recognized by certain ISPs as being afforded a certain quality of service based on a pre-existing agreement with the vendor of such and application. But in general, there are limited data management techniques applied to manage data sent and received by client devices relying on their ISPs for sensitive data, preferential data and/or other advanced data management services.

SUMMARY

Example embodiments of the present application include a process which may include hosting client devices on a conference call via a virtual private network including determining, via a virtual private network (VPN) server, one or more client devices are currently content sharing during a conference comprising a plurality of active client devices, monitoring, via the VPN server, communication session parameters of one or more of the client devices which are forwarding the shared content to the VPN server, wherein the shared content is destined for one or more of the other client devices, modifying, via the VPN server, one or more of the communication session parameters of the one or more client devices which are forwarding the shared content to the VPN server, and determining whether the modified one or more communication session parameters have increased a performance of the one or more other client devices.

Another example embodiment may include an apparatus such as a virtual private network (VPN) server that includes a processor configured to determine one or more client devices are currently content sharing during a conference comprising a plurality of active client devices, monitor communication session parameters of one or more of the client devices which are forwarding the shared content to the VPN server, wherein the shared content is destined for one or more of the other client devices, and modify one or more of the communication session parameters of the one or more client devices which are forwarding the shared content to the VPN server, and determine whether the modified one or more communication session parameters have increased a performance of the one or more other client devices.

Another example embodiment may include a non-transitory computer readable storage medium configured to store instructions that when executed causes a processor to perform determining, via a virtual private network (VPN) server, one or more client devices are currently content sharing during a conference comprising a plurality of active client devices, monitoring, via the VPN server, communication session parameters of one or more of the client devices which are forwarding the shared content to the VPN server, and the shared content is destined for one or more of the other client devices, modifying, via the VPN server, one or more of the communication session parameters of the one or more client devices which are forwarding the shared content to the VPN server, and determining whether the modified one or more communication session parameters have increased a performance of the one or more other client devices.

DETAILED DESCRIPTION

Figure 1:
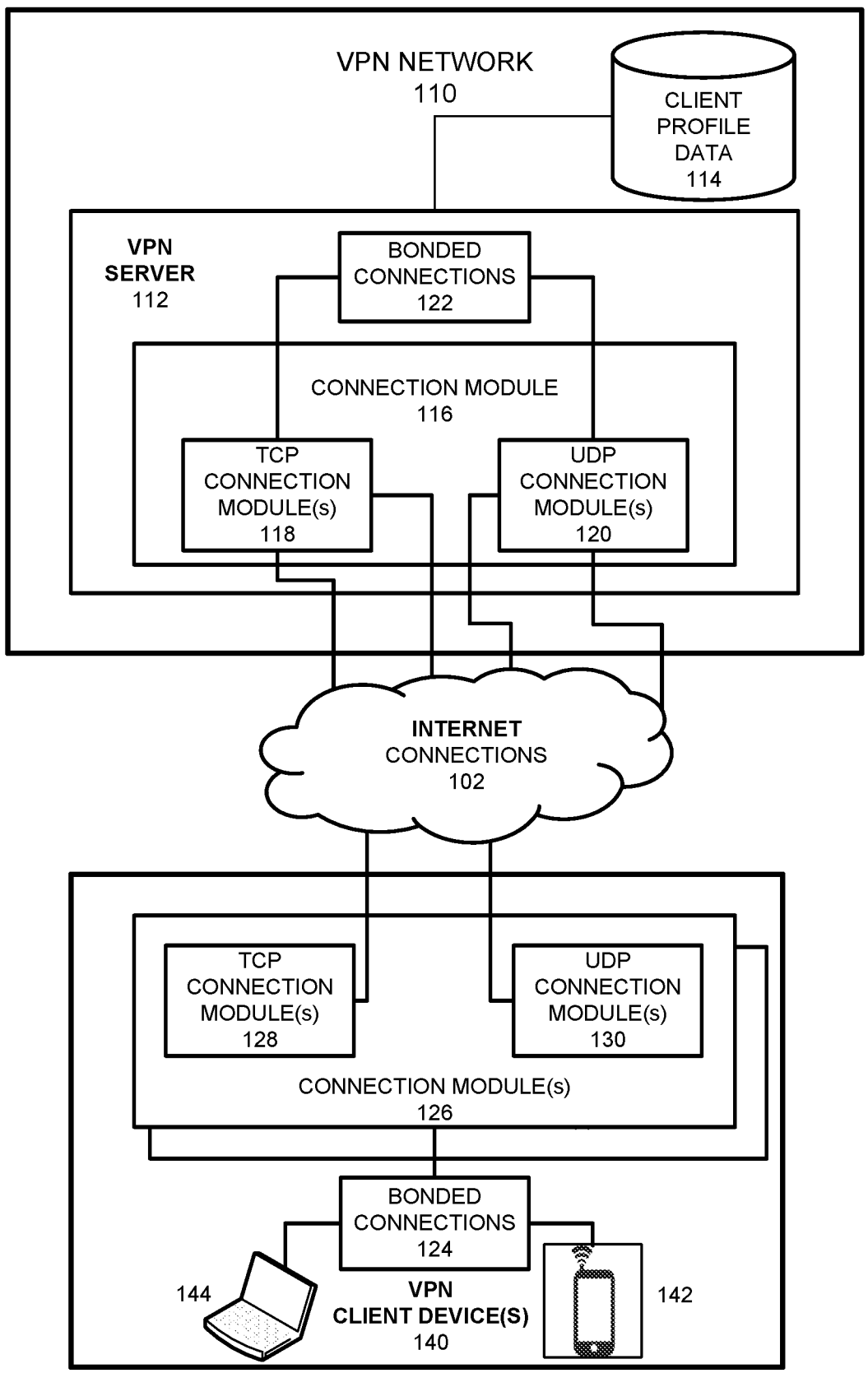
FIG. 1 illustrates an example data session network configuration according to example embodiments.

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

Example embodiments provide data management services for client devices participating in a conference or other type of collaboration. Certain conference calls may have actions or triggers which can be detected and used to initiate certain data management operations, such as optimizing data flow for one or more client devices participating in the conference call via a conference application operating on a client device and/or a corresponding server. Data may be prioritized for one or more users over other users participating in the call, data packets which are identified as real-time or audio/video packets may be prioritized over other types of data packets, such as email data, browser data, other types of application data, etc. Data may need to be compressed, encrypted, etc., to maintain data management strategies and protocols. For example, data packets may be required to include certain headers, remove certain headers and/or include other packet routing data in order to optimize conference requirements.

Example embodiments may be referred to with reference to a communication 'session'. The term session may be a communication data link between a 'client' (computing device, smartphone, computer, etc.) and 'server' (content server, virtual private network server, destination server, etc.) or any two or more network-based entities in communication across a data communication network. A session may be based on a single communication link or channel or multiple links or channels. Examples of multiple channels being used in a session may be based on multiple network interface devices (i.e., network interface cards (NICs)) being used in a single session, multiple TCP/UDP sockets being created in a single session among other device resources. Multiple transport connections which are established via TCP and/or UDP may also be considered a session. Additionally, encryption that is used for the session may be independently established to include a unique key for each transport connection and/or channel established for the session. The session encryption may instead by a single key encryption used to encrypt all the communication exchanges during the session. In general, most transport connections are encrypted independently. All of the described examples of a session may be adapted to include one or more alternatives or combinations thereof. Each session may be subjected to multiple different communication mediums providing a variety of one or more channels, transports, radio links, physical links, network interface cards and wireless and/or wired connections.

Network connection optimization for an application server provides data network access through communication channels to one or more client devices. Data communication protocols may include one or more of a transmission control protocol (TCP) and/or a user datagram protocol (UDP). Also, the TCP/IP protocol suite enables the determination of how a specific device should be connected to the Internet and how data can be exchanged by enabling a virtual network when multiple network devices are connected. TCP/IP stands for transmission control protocol/Internet protocol and it is specifically designed as a model to offer reliable data byte streams over various interconnected data networks.

UDP is a datagram/packet oriented protocol used for broadcast and multicast types of network transmissions. The UDP protocol may work similar to TCP, but with some of the error-checking criteria removed which reduces the amount of back-and-forth communication and deliverability requirements.

TCP is a connection-oriented protocol and UDP is a connectionless protocol. The speeds associated with TCP are generally slower than UDP, while the speed of UDP are generally faster within the network with regard to sending data across a network. TCP uses a 'handshake' protocol such as 'SYN', 'SYN-ACK', 'ACK', etc., while UDP uses no handshake protocols. TCP performs error checking and error recovery, and UDP performs error checking, but discards erroneous packets. TCP employs acknowledgment segments, but UDP does not have any acknowledgment segment.

A TCP connection is established with a three-way handshake, which is a process of initiating and acknowledging a connection. Once the connection is established, data transfer begins and when the transmission process is finished the connection is terminated by the closing of an established virtual circuit. UDP uses a simple transmission approach without implied hand-shaking requirements for ordering, reliability, or data integrity. UDP also disregards error checking and correction efforts to avoid the overhead of such processing efforts at the network interface level, and is also compatible with packet broadcasts and multicasting.

TCP reads data as streams of bytes, and the message is transmitted to segment boundaries. UDP messages contain packets that were sent one by one. It also checks for integrity at the arrival time. TCP messages move across the Internet from one computer to another. It is not connection-based, so one program can send lots of packets to another. TCP rearranges data packets in a specific order. UDP protocol has no fixed order because all the packets are independent of each other. The speed for TCP is slower and UDP is faster since error recovery is omitted from UDP. The header sizes are 20 bytes and 8 bytes for TCP and UDP, respectively.

In general, TCP requires three packets to set up a socket connection before any user data can be sent. UDP does not require three packets for socket setup. TCP performs error checking and also error recovery and UDP performs error checking, but discards erroneous packets. TCP is reliable as it guarantees delivery of data to the destination router. The delivery of data to the destination is not guaranteed by UDP. UDP is ideal to use with multimedia like voice over IP (VoIP) since minimizing delays is critical. TCP sockets should be used when both the client and the server independently send packets and an occasional delay is acceptable. UDP should be used if both the client and the server separately send packets, and an occasional delay is not acceptable.

FIG. 1 illustrates an example data session network configuration according to example embodiments. Referring to FIG. 1, the configuration 100 may include a virtual private network (VPN) 110 which includes one or more VPN servers 112 and data storage, which in this case is used for storing client profile data 114 associated with one or more new or old client communication sessions. The term 'VPN' may represent one or more servers designated to perform the VPN functionality. The communication sessions may include multiple network channels, generally, UDP and TCP are used for such sessions, however, other protocols used across the Internet 102 may also be used, such as HTTPS. The channels may be bonded together to create a single virtual channel for communication as shown from the bonded connections module 122 for the VPN server 112 and the bonded connections module 124 of the client device 140. In general, the VPN 112 may include UDP module(s) 120 and a TCP module(s) 118 as part of a connection module 116 to manage the connection process and a bonded connections module 122 to manage the various channels and the bonding of information among the channels.

The client side may include one or more client devices 140 such as a smartphone 142, cell phone, tablet, laptop 144, etc. Any one of those individual devices may be the 'client device' 140 at any particular time for a particular session. The client side may have an installed agent software application that communicates with the cloud servers of the VPN network 110. The communications are established and maintained across the Internet 102. The client side may also have its own bonded connections module 124 which manages one or more TCP/UDP connections associated with TCP/UDP connection modules 128/130, each of which may have multiple modules to accommodate multiple session, as part of the connection module(s) 126 of the client side. The module 126 may be multiple modules which are used for multiple respective sessions with various end user devices 140.

In general, a transport connection is a connection between the VPN client and the VPN server over a particular network and/or Internet connection using a particular protocol, such as TCP, UDP, HTTPS, or another protocol. The established connection is used to send encapsulated and/or encrypted application packets between the client and the server. In one example embodiment, multiple transports connections are created for each session over the available networks and protocols. Conventionally, a VPN will create one transport connection over one network with one protocol per session. For example, given two networks to utilize, the data connection optimization application may create three transport connections (e.g., TCP, UDP, and HTTPS) over each network, for a total of six transport connections. Other combinations of connection types, numbers of connections, etc., may also be utilized.

A VPN may be used by any client device participating in a collaboration session (i.e., conference) with other client devices. One device among a plurality of devices may be using a VPN while others are not using any VPN. All of the devices may send data and receive data to and from an application server in a cloud network, however, one or more client devices may use a VPN server as an intermediate/third party device to assist with the data management of that particular client device. One strategy employed by a VPN may include channel management over a single session. For example, multiple channels may exist for a single client device and can be combined into a bonded channel (unique data is sent on more than one channel), a mirrored channel (the same data is sent on more than one channel) or a combination of both. The channel management activities may permit packets to be sent and received faster and/or with fewer errors depending on the strategy employed by the VPN server. The VPN server(s) may have an optimal Internet connection to the application servers in the cloud network, and may use certain fundamental routing strategies to optimize data traffic quality, the VPN could send video data first from certain client devices to the cloud servers as opposed to browser request data, e-mail data, and other types of Internet data. All of these data management strategies and others can be managed by a VPN specific application that is operating on the client devices while the conference or other collaboration application is being utilized. The VPN application may be a background type of application that is not detectable by the user or other applications using Internet data services. The VPN server may also attempt to host its own conference assuming the VPN server offers an application that is managed locally by the VPN server so the client devices which are part of that VPN network can have the VPN server perform additional conference application functions.

One specific example embodiment may be its own embodiment that is separate from other example embodiments, or which may be shared with other embodiments by one or more specific operations specific to this embodiment, or which may have other embodiments share specific operations with this particular embodiment. This example may include a VPN server identifying a direct link or 'connection' between two or more client devices. In this case, the VPN server may attempt to remove itself from certain client device to client device data exchanges. This removal effort by the VPN server may be a partial removal where only certain data flows between client devices are not sent to the VPN server while other data exchanges from the same client devices are sent to the VPN server ('VPN'). Such a data management effort may be set for a certain period of time during a specific session of conferencing, file sharing, screen sharing, etc., among the client devices.

The direct data sharing may be between two, three or more, client devices. When the data sharing is identified (e.g., a conference call), the VPN can identify the data streams being sent from the client devices to the VPN as destined for each of the other client devices prior to forwarding an instruction to the client devices to communicate directly with one another during the application use and/or for a specific period of time. The VPN can then reduce resource allocation by not having the Internet data arrive at the VPN from one client device as intended for another client device and vice versa depending on how many client devices are utilizing the VPN. The conference session data can then be offloaded from the VPN when the data packets are numerous and continuous for an appreciable amount of time between certain client devices. Certainly, the data exchanged between the client devices may not be 'direct' but instead may be over respective Internet connections offered by the Internet service providers and without the data be sent to the VPN server.

Figure 2:
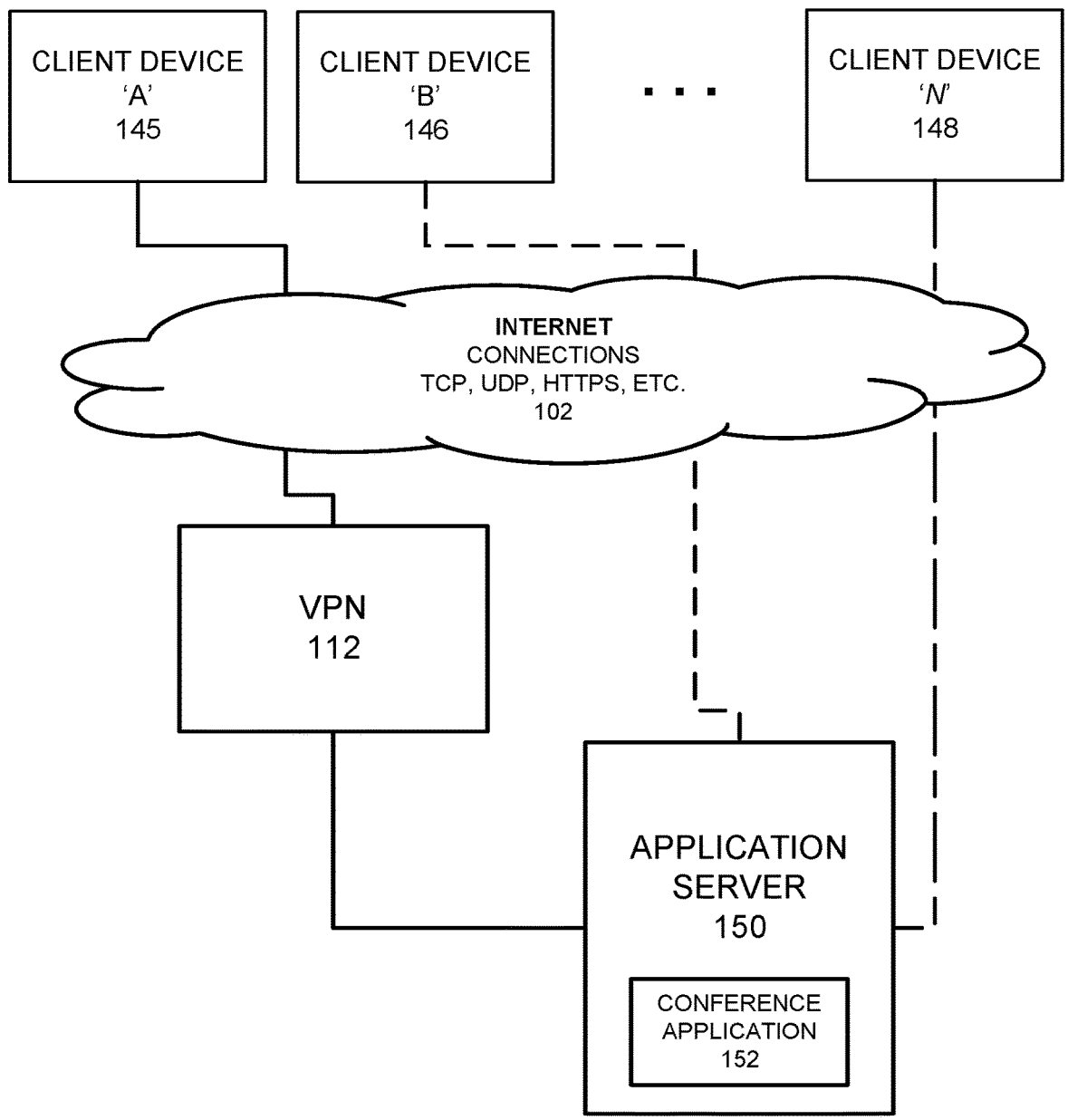
FIG. 2 illustrates an example network configuration of multiple client devices communicating together during a conference with one client device utilizing a VPN server according to example embodiments.

FIG. 2 illustrates an example network configuration of multiple client devices communicating together during a conference with one client device utilizing a VPN server according to example embodiments. Referring to FIG. 2, the configuration 200 includes a plurality of client devices 'A' 145, 'B' 146 . . . 'N' 148, which represent the one or more devices which are collaborating in a particular application. The example of a conference is one example application, as one skilled in the art would readily recognize there are other applications where client devices are sharing a common application platform, such as gaming, file sharing, etc., to exchange data via a server or via direct connections across the Internet. In this example, the Internet 102 may be used by applying any one or more protocols for data packet exchanges. A first client device 145 may be using a VPN 112 as an intermediate entity to manage its Internet data sent and received. A second device 146 may not be using any VPN and may communicate with the application cloud server 150 and the conference application 152 directly over the Internet. The client device 148 or the 'Nth' device may also be using a direct connection to the application server 150 without a VPN. Each device's communication path is denoted by a unique line pattern.

In one example, the VPN 112 may identify a plurality of client devices communicating with one another over a respective plurality of network connections used during a communication session. The VPN server 112 will identify that two client devices are attempting to communicate, and the destination address on the Internet packets sent from client device 'A' 145 to client device 'B' 146 may be recognized as having common IP address(es), which would indicate an ongoing communication session, this is evidence that the bypassing/offloading of traffic from the VPN should be performed since the VPN 112 is only creating a longer data exchange route. In this case, it would be most optimal for that data exchange if the VPN 112 would remove itself from those back and forth communications between the communicating devices. In this example, client device 'A' 145 will be an active VPN user. Client device 'B' will be a non-VPN user and can still be effected by the VPN since the instruction may be sent to the client device 'A' 145 to communicate directly with the client device 'B' 146. However, another scenario may include the client device 'B' 146 being a member of the VPN network and sending and receiving data via the VPN 112. In either scenario, the VPN may instruct devices 145 and/or 146 to stop sending conference specific data, via a conference specific application that ultimately is sent to an application server 150, to the VPN 112 and instead form a channel between the two or more client devices while using the conference application. The instruction may include a specific socket that can be used to have the conference data bypass the VPN.

The VPN may forward direct communication instructions to the plurality of client devices to establish one or more direct tunnels between one another without forwarding inter-client communication data to the VPN server. The other types of data, such as browser data, e-mail data, etc., may still be sent and received by the VPN 112 while the conference specific data is sent to and from the client devices without being sent to the VPN 112. It is important to note that client device 'A' 145, for example, may forward other types of data to the VPN 112 continuously without including the conference specific data, such as text data, image data, audio data, video data, etc. The VPN 112 may initiate direct communication between the two or more client devices by sending instructions, which may include IP addresses of those participating client devices, ports, identifier names, to all parties. The client devices will use the VPN agent application on their own devices to setup a tunnel so destination specific packets can be exchanged through a path outside the VPN server. Other data is still shared with the VPN by all devices which were previously communicating with the VPN, and those non-conference or other collaboration application types of packets can be continuously sent to the VPN because they are not destined for the other client device(s) participating in the collaboration.

The VPN 112 may receive the additional data from the plurality of client devices during the communication session when the additional data does not identify any of the client devices as intended recipients of such additional data, and the VPN server may use a client device 'plug-in' agent as the data mediator installed on the client devices to determine which data should be sent to the VPN server, the instructions or routing criteria in the agent or client portion of the application may instruct the client devices on where to send which data packets. The client devices will make the decision to not send data to the VPN server based on the instruction received since the IP and port information has created a rule in an internal routing table stored in the client device on where to send the data packets related to the conference. The rule may have a time limit that dictates how long the data related to the conference is sent via a particular socket assigned to the client device during the conference. When the time limit is over or the application has exited, the rule may be removed and all data may again be sent to the VPN 112 by those client devices which are subscribed to the VPN 112 data service.

In one example, there are two or more VPN client devices which utilize the VPN during a communication session that includes a collaboration application, such as conferencing or P2P (peer-to-peer) communications. In this example, having more than one VPN client, the VPN can identify data being sent and received on behalf of each client device, the decision to offload the traffic away from the VPN can be made quicker since the two client devices are communicating directly with one another. When switching from a VPN traffic receiving model to a direct communication between client device model, the VPN may send two sets of instructions, one to client device A and one to client device B inquiring whether the direct communication should occur, the inquiry or request and response may be automated and may be based on an application setting which defaults to accept or reject the request by the client(s) device(s).

Concerns about having the client devices communicate directly may include different versions of application software on one device and not the other device, which may create version control concerns, security concerns, etc. However, assuming the client devices can communicate without mismatched software, the client devices may: receive public IP addresses and ports (socket information), negotiate between themselves to share security and encryption keys and negotiate other parameters for the direct communication to be enabled. All decisions and ongoing information sharing may be monitored and tracked by the VPN, the address information used by the client devices and related parameters can all be known to the VPN which may store the information in a profile associated with the client devices. The objective of offloading data sent and received by the VPN may not include certain control information that is still periodically sent to the VPN by each client device during the offloaded data sharing session to enable the VPN to track the progress and status of the client devices while those devices are offloading data traffic away from the VPN and sharing the information directly over an Internet connection that does not include the VPN. The shared information about the conference may include confirming the existence of direct conference data sharing, port information, IP address information, protocol information, encryption details, etc., which are used by the client devices during the direct conference or P2P data sharing.

One approach after establishing a direct communication connection between client devices may include all traffic destined from one client device to another is sent without using the VPN being used to forward and receive the data traffic. If the direct connection between the client devices is experiencing connection degradation, such as latency, jitter and/or packet errors, the VPN may be invoked to manage the data traffic until a threshold period of time has passed where the traffic is not experiencing any unacceptable levels of data degradation and the VPN can again be bypassed in favor of a direct connection without the VPN. The VPN may also decide whether to bond two or more channels for a given client device to use on the Internet and/or with the VPN. The VPN may monitor the data connection parameters and make decisions to change the connection strategy at any time.

In one example process of managing client devices, the VPN server may detect traffic between two VPN client devices. The VPN server sends messages to both VPN clients, to determine if a direct connection is possible. The message may include information specifying the protocol to use for data transport, ports, and IP addresses of the application traffic flow. This approach enables either client device to decline or accept the proposal to communicate directly. If both client devices respond messages accepting the proposal, the VPN server sends the IP address and port of each client to the other client so they can exchange IP/port information in an attempt to communicate. Also, the VPN client may send back a preference of which IP/port to use in its acceptance message. The VPN clients receive the IP/port information of the other client and may then attempt to establish a direct connection to one another. If the direct connection succeeds, then the client devices can make the decision to send some or all of the traffic over this direct connection. At any point, either client could go back to sending data through the VPN server for some period of time, decide to close the direct connection, etc. The communication session between the clients through the VPN server would still be open and the client devices could decide to send the traffic through the VPN server, through the direct connection, or both at any time. For example, if the client devices have the direct connection and suspect it might be starting to fail, then they could decide to send traffic redundantly through both the VPN server and the direct connection. In one example, an idle time where there is no traffic over the direction connection may invoke a decision to close the direct connection.

Figure 3:
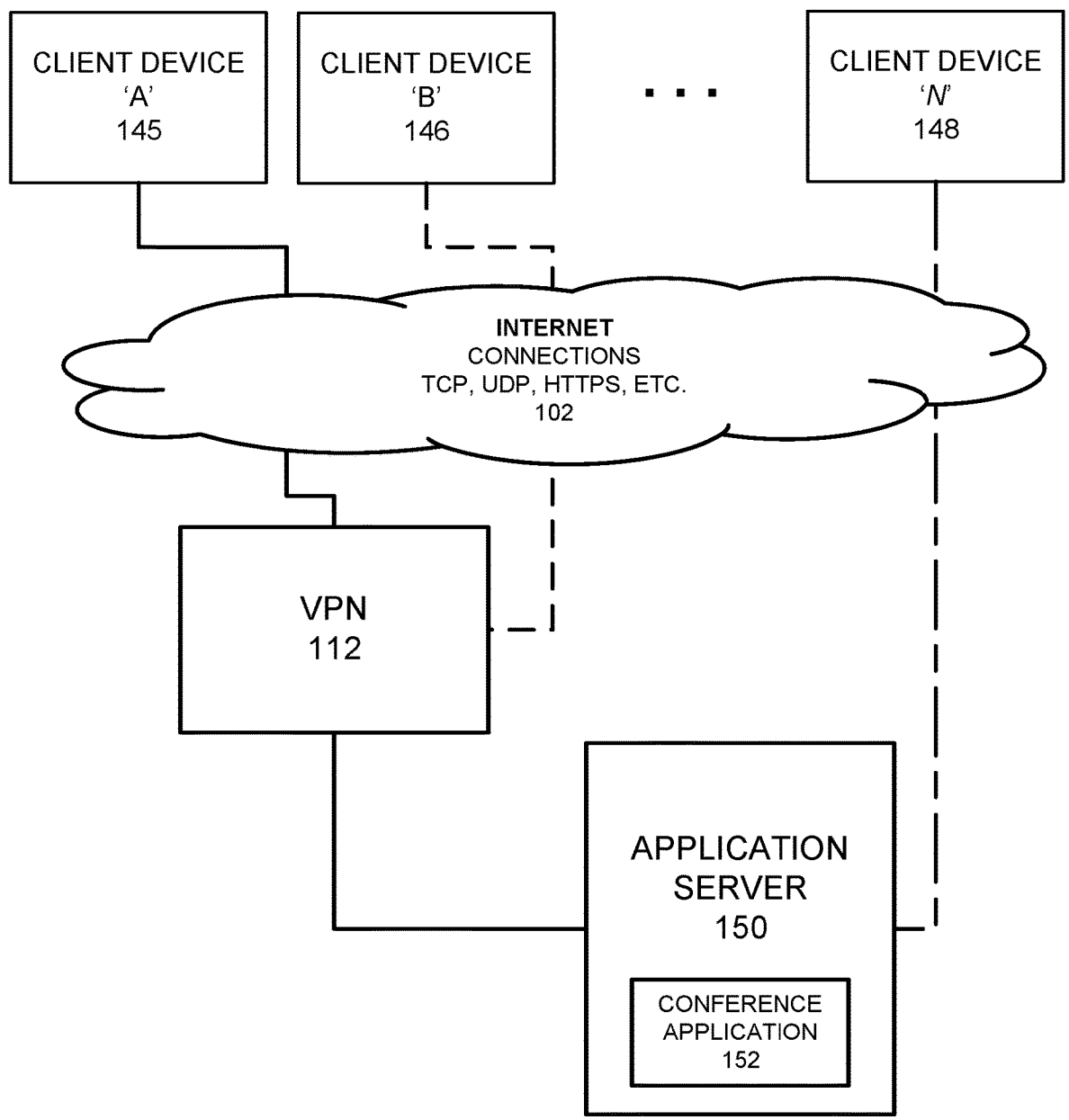
FIG. 3 illustrates an example network configuration of multiple client devices communicating together during a conference with more than one client device utilizing a VPN server according to example embodiments.

FIG. 3 illustrates an example network configuration 300 of multiple client devices communicating together during a conference with more than one client device utilizing a VPN server according to example embodiments. Referring to FIG. 3, in another example, the conference attendees/client devices may be communicating with an application server that hosts the conference. A VPN 112 may be used by one or more of the client devices and certain triggers performed by the one or more client devices during the conference may cause a change in the current settings of one or more client devices. For example, there may be multiple active client devices operating on the active conference. When one device is sharing content with at least one other client device, the VPN server 112 may detect a change (i.e., increase) in the amount of data consumed by the sharing client device as the data is sent to the VPN server to be routed to the other client device(s). A data management application operating on the VPN server and as a plug-in or agent on one or more of the client devices may cause dynamic data management changes to occur, such as an increased data rate over a channel.

Conferencing with multiple devices may invoke a quality of data stream modification operation to occur on a per-user or users' basis. In turn, the quality of parameters, audio only vs. audio and video, low quality audio, low quality video, high quality video and a combination of all those types of data sharing options may invoke a change to perform channel bonding between each of the client devices and the VPN 112. In one example, if a VPN 112 can identify the data streams of multiple different conference participants since multiple client devices are subscribed to use the VPN 112, then when changes occur, such as one device is providing audio/video content to the other devices, then it can be inferred that the conference has started. Another inference may be identifying when audio/video is turned on for a particular client or both client devices generating the content and receiving the content. By relying on the application programming interface (API) of the conference application, a 'trigger' in the application may be identified and then changes can be made to accommodate the performance of the application as it is viewed from the perspective of each of the client devices.

In one example, one client device 145 could initiate a conference call, and the other client devices 146/148 are invited. The conference is managed by a VPN application which includes a conference bridge sub-application that can actively control the conference either entirely without the need for the application server 150 or in conjunction with the application server 150 and application 152 so certain operations are controlled by the VPN 112 while others are not controlled by the VPN 112 and are maintained by the application 152. In this example, each data channel for each client device is connected to the VPN server or 'conference bridge application' which is currently managing the conference data. Facilitation of each client device's data quality and lack thereof is managed centrally by the VPN server 112.

In operation, the VPN 112 may use its conference application to facilitate channel bonding decisions for each client device depending on one or more conference triggers, such as one or more client devices begins providing audio/video, other client devices being receiving audio/video, one or more client devices stops offering audio/video, etc. When triggers occur, the VPN 112 may attempt to bond two or more channels for those conference participants which are effected by the change, such as bonding a Wi-Fi channel with a cellular data channel as a single session for a single client device. Another approach may be to reduce the quality of a client device's audio/video content to reduce overall network data usage to the other client devices. Alternatively, a single client device may have its bandwidth data analyzed and when the bandwidth is considered 'low' this may trigger a global change to all client devices using the conference application to reduce their data rates for audio/video sharing, or to increase their data rates by bonding two or more channels per client device. Another trigger could be a data rate used by a client device for video, such as high definition 1080p or other high definition data rates. When that video data rate is detected, an analysis of the data rates of all client devices may be examined to determine whether the client devices can sustain data at such a rate, if not, the need to modify the data rate encoded and provided to the client devices may be necessary as well as channel bonding or other data optimization techniques. Socket information provided to the client devices from a VPN may identify a cellular communication network. Also, socket information used to establish a direct communication path may identify a Wi-Fi communication network as opposed to a cellular network.

In one example, the VPN 112 may test the data connections and identify initial connection measurements for all client connections. Then, if one of the client's has a data capacity deviation from the others, a decision will be made to reduce the initial information sharing data rate to accommodate the one client. If the one less than optimal client device is not sharing content, then that client device can have a reduced data rate to step down the quality of the content. Or, the one client can have their channels bonded, while the other clients don't require any action. When the client device that is presenting data has a higher bandwidth capacity then a minimum amount required then there will be options on how to manage and preserve quality during the conference, if not, then preventive measures need to take place to protect all client devices form latency and quality concerns experienced during the conference. One approach is to encode and forward data in multiple levels of quality. Data encoding in real time and being sent in real time at more than one quality 1080p, 480p, etc., could provide alternatives to the client devices without creating a single rule to all members of the conference. If a client device presenter has the bandwidth to share high quality video in the live conference and various ones of the other users do not have the same amount of bandwidth, then channel bonding could be used for those users to have the bandwidth to receive the higher quality video. Another approach may include one user in a group of conference users having a lower threshold bandwidth than the other users, then providing audio only to that user while forwarding video with audio to the others.

In another example embodiment, the conferencing client devices may all be subject to initial settings imposed to each of the client devices at the initial conference establishment. The settings may be optimal settings which are selected and imposed by the VPN 112 during a setup operation to create an initial optimal communication environment through protocols, data rates, limits, etc., imposed on all the client devices under the control of the VPN based conference data management application. The VPN may send the settings as a library index data file to all client devices to be loaded in their conference application agent application which may also be a VPN agent application. The VPN may have some initial options or settings to provide to the client devices to use those settings, then the VPN may continually monitor each client device's data settings to determine whether any subsequent changes are necessary. The VPN manages the conference data for multiple client devices and performs resource balancing for all client devices' benefit.

One example process may include receiving, at a virtual private network (VPN) server 112, a plurality of conference confirmations from a plurality of client devices 145-148, this may be performed once the conference attendees have logged in to the conference bridge managed by the VPN alone or in conjunction with the application server 150 and conference application 152 in the cloud. The process may also include forwarding, via the VPN server 112, a first set of conference parameters to a plurality of client devices participating in the conference. The operating parameters may include the VPN providing certain protocols to be used on the channels created between the client devices and the VPN, such as transport layer protocols, and a library that integrates with the conference application so bonding may occur. Also, data rates may be established to conform with the amount of data the majority of the client devices can handle as well as the VPN 112. Instead, the initial data rates to be used during the conference may be based on the lowest data rate of any of the client devices to ensure no device experiences latency or loss of data. Continuing with the same example, the process may include identifying a conference action trigger performed by one or more of the client devices, the trigger could be any one client device begins communicating with the VPN and/or other client devices by sharing video/audio, etc., another trigger may be the client devices stops sharing, or experiences a change in their measured data rate or other network data parameters, such as latency or jitter experienced by the packet data. The measurements may be performed by the VPN 112 and/or the client device prior to confirming the client device performance. The process may also include performing a conference data managing (CDM) action to modify one or more of the first set of conference parameters of the one or more client devices responsive to the conference action trigger. This may include modifying initial data rate conference parameters for one or more client devices and/or restricting bit rates of content, such as video and audio to accommodate those client devices which do not have the same amount of bandwidth available as some other client devices. Additionally, not all client devices may have multiple separate channels available to perform bonding or combining of more than one channels, as a result, the amount of data available to those client devices may be limited.

Continuing with this example, when the conference initiates (i.e., a trigger is enabled) one or more client devices will begin to operate the conference application and at least two client devices are being managed by the VPN as conference participants. In this example, the communication between those two client devices which are part of the VPN data management process may have a different communication scheme then the other client devices on the conference. Initially, the conference data identified and sent to and from those client devices which are utilizing the conference application may be prioritized over other types of data at least within the data management sent to and from those client devices and the VPN. Next, the conference data may be monitored for a period of time to ensure the client devices are utilizing an optimal channel or channels and any changes which are necessary to ensure one or more of a data rate threshold, a jitter threshold, a latency threshold, a packet loss threshold, etc., are adhered to may be identified and managed by the VPN and sent as instructions from the VPN to the client devices to modify existing operating parameters.

Another approach to optimized data management may include instructing one client device that one or more additional client devices is experiencing less than optimal data services, this may result in the client device(s) turning off video and maintaining audio to ensure a bit rate that will accommodate the lowest data rates available to any client device. Another option may be to modify the conference settings of one client device 'A' 145 that is not experiencing any data rate problems to assist user 'B' 146 who is experiencing the data rate problems as they both co-exist as active VPN clients operating with a third party conference application.

Prioritization may be performed based on a client device and among the traffic of the client device itself, and may include a distinction of prioritizing conference data vs. non-conference data as managed by the VPN 112. Prioritization may also be performed to prioritize one client device over another client device being managed by a VPN. Another type of prioritization may be for a presenter or speaker client device during a conference providing content to the VPN to be shared with all conference attendees while the non-speaker client devices which are passively receiving data may be less prioritized which permits the larger data consolidation efforts to be preserved for the devices providing content to ensure seamless data content.

One example embodiment may include a process that includes receiving, at a virtual private network (VPN) server, data from one or more client devices and determining the data includes conference data used to share content during a conference and prioritizing the conference data to have a higher priority than other portions of the data received from the one or more client devices. In order to ensure the higher priority, the VPN may perform forwarding of instructions to the one or more client devices to bond two or more communication channels between the VPN server and each of the one or more selected client devices to ensure the prioritized conference data is received over the bonded communication channels which provide a larger amount of bandwidth and which tends to reduce the amount of undesirable data degradation such as jitter, latency and packet loss.

The VPN may monitor the data traffic shared between one or more client devices participating in a conference or related data sharing application. The amount of data traffic that is shared between the client devices may be throttled or reduced, such as the video traffic. The approaches may include identifying which client devices are experiencing data degradation over time and controlling an amount of data sent and received by one or all client devices to assist the client device which is not able to maintain optimal data communications. The VPN can identify all traffic coming to a particular client device assuming that device is using the VPN. One approach is to identify all video data coming from multiple IP addresses to one VPN client. The decision to modify a data rate (e.g., 480P, 720P, 1080P, etc.) used for video may be to reduce the overall data exchanged between the client devices. The VPN can also instruct the client device experiencing data degradation to: bond two or more available channels (e.g., Wi-Fi and cellular), switch to audio only, prioritize certain data traffic received from the client device (e.g., video vs. other application data) over other data, drop a certain amount of packets, reduce data throughput, etc. The VPN cannot control other client devices which are not using the VPN to communicate during the conference, however, the VPN can control data rates to and from the client device that is using the VPN which could have an effect on the other client devices which are not using the VPN. If the VPN reduces the data rate output of conference client device, then those other client devices will not have to receive, buffer and process as much data when the client device using the VPN is sharing data.

In another example, assuming the VPN has control over more than one client device, then those at least two client devices participating in the conference will have their conference data exposed to the VPN. As a result, the VPN can monitor data destined for those two or more client devices and cause changes in data management. For example, client A can be instructed to reduce data video quality to assist with data optimization for client A and/or client B. Similarly, client B can also be instructed to reduce a data rate which could have an effect on clients A, B and others.

When establishing a conference, the VPN may forward an application specific common platform to perform the conferencing, including default parameters which may include whether to bond channels or not, a video data rate/video quality, an audio data rate, using video vs. audio, and other default settings, which may include limiting the passive conference listeners to the amount of content they are sharing while others are presenting, if a client device is receiving content as a 'listener' then that client device can receive video from one or more presenters and not share video during a time period but maybe audio only, then at some point the presenter(s) change and the former presenters become listeners. After a period of monitoring time, the conference application will identify client devices which are not performing optimally, and make further modifications to all client devices on the conference or just certain ones on the conference. Some clients will receive a higher quality video and others will receive a lower quality video, the VPN may manage multiple data streams including high and low data rate video and share only those streams with the appropriate parties. The VPN may receive a high-quality data stream from one client device and encode the stream to compress the data and output lower quality video streams to other client devices which may have been flagged as not having optimal data communication. Each client device may receive a different sized data stream including a different quality of video all of which are managed by the VPN.

Figure 4:
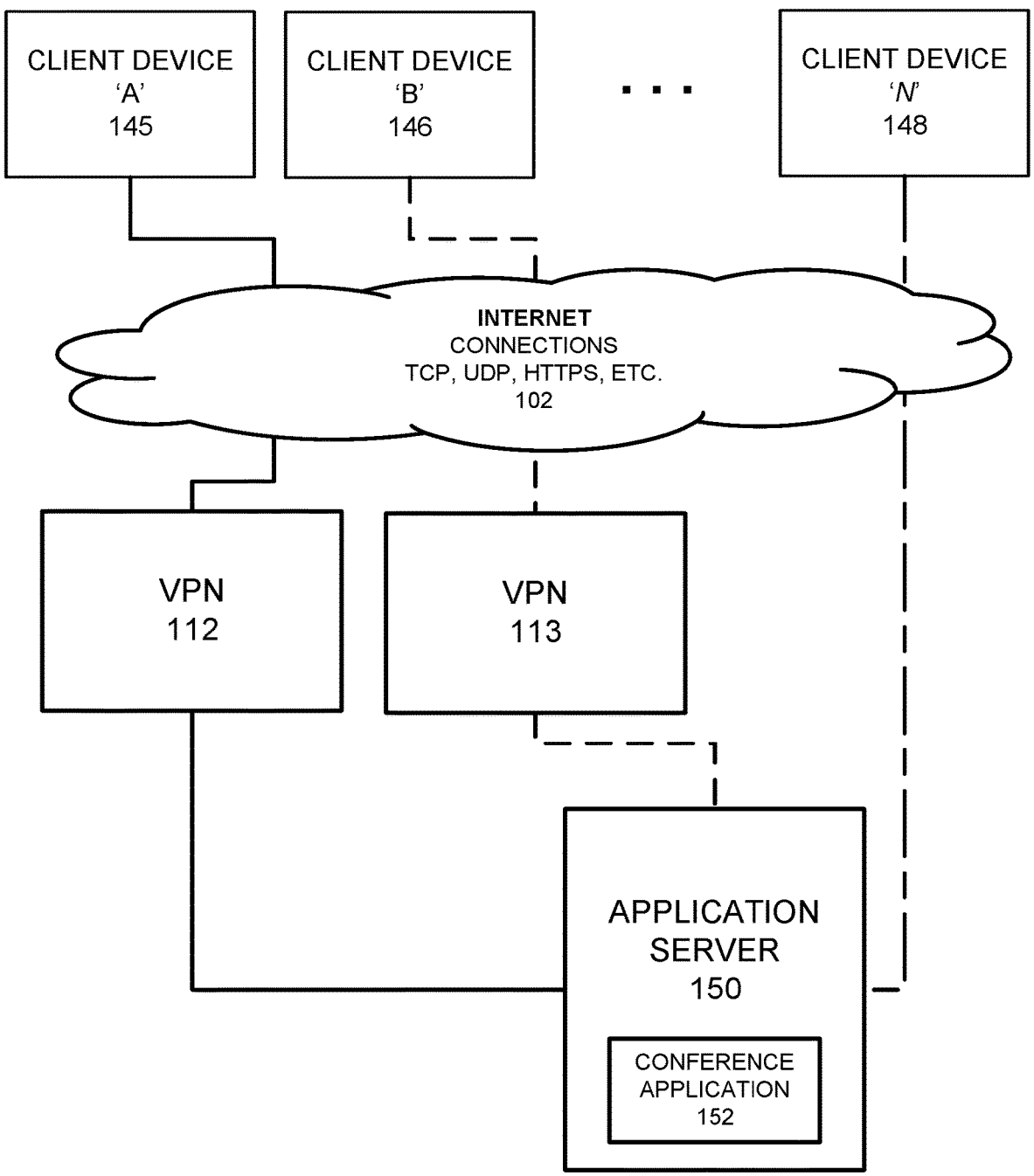
FIG. 4 illustrates an example network configuration of multiple client devices communicating together during a conference with more than one client device utilizing respective VPN servers according to example embodiments.

FIG. 4 illustrates an example network configuration of multiple client devices communicating together during a conference with more than one client device utilizing respective VPN servers according to example embodiments. Referring to FIG. 4, the example 400 includes two VPN servers 112 and 113. The client devices 145 and 146 are each using separate VPNs 112 and 113, respectively, to accommodate the client devices during the conference. In this example, there may be one, two or more VPN servers available and all of which are part of the same network of data management services. A client device location is usually relevant to which VPN server it is assigned since the data between the client device and the VPN server is generally faster and requires less hops when the distance is smaller. However, there are other criteria for assigning VPNs to the client devices. For example, as a capacity is reached for one VPN, another VPN may be necessary to accommodate additional client devices and provide them with data services.

Figure 5A:
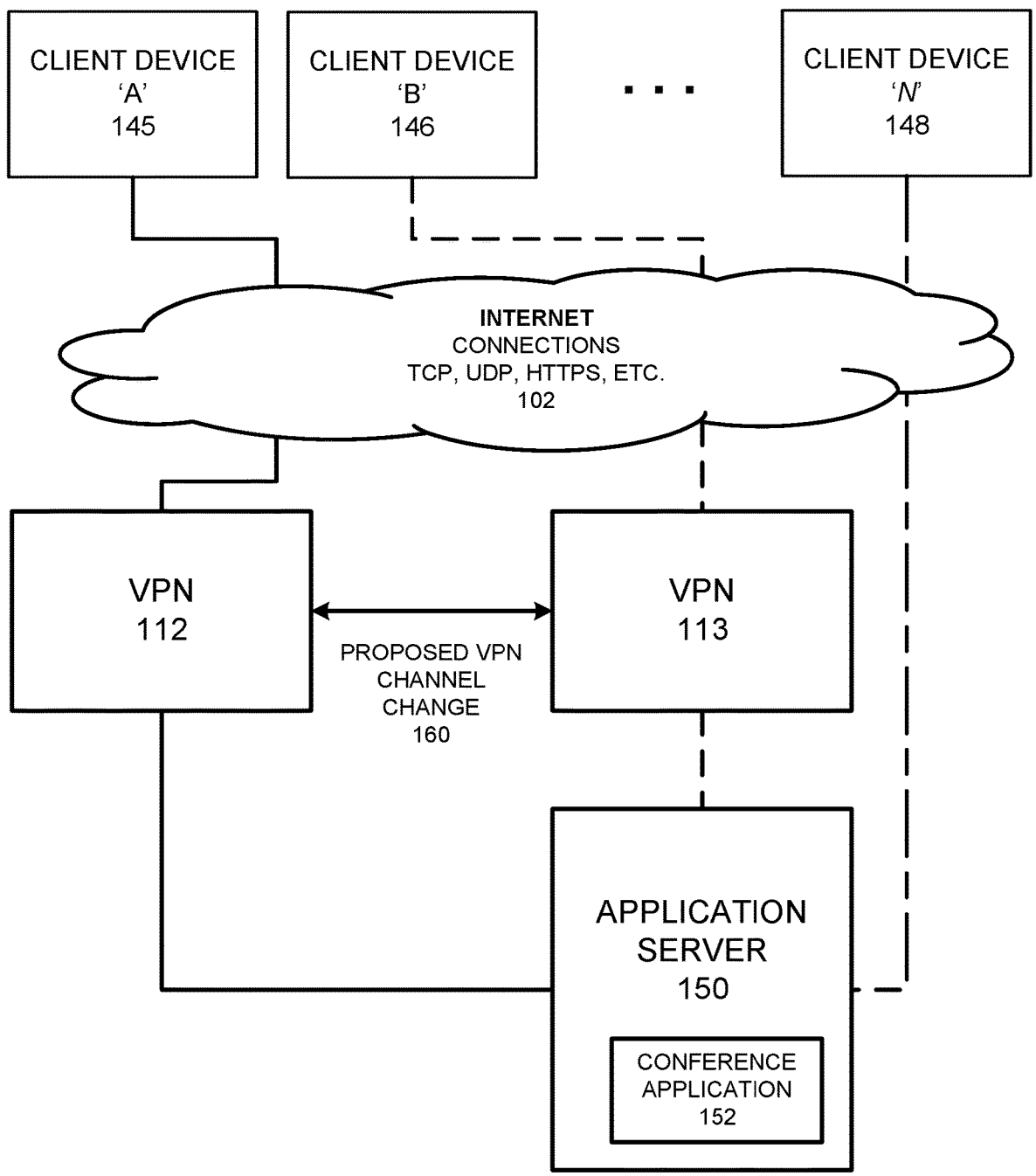
FIG. 5A illustrates an example network configuration of multiple client devices communicating together during a conference with more than one client device utilizing respective VPN servers which are communicating an exchange according to example embodiments.

FIG. 5A illustrates an example network configuration of multiple client devices communicating together during a conference with more than one client device utilizing respective VPN servers which are communicating an exchange according to example embodiments. Referring to FIG. 5A, the example 500 demonstrates how a particular procedure invokes the use of additional VPNs to manage conference client device participants. In this example, a client device 145 may be assigned to a first VPN 112 and another client device 146 is assigned to a different VPN 113. The conference application may decide that one VPN should host all the conference participants for a consistent data management strategy and/or the amount of client devices currently using a VPN 112/113 has exceeded a particular limit and the additional conference participants should be assigned to a different VPN. Another criteria may be assigning a VPN to each client device participating in the conference that is located in a central location with respect to the majority of the client devices' locations. The VPNs may communicate directly to negotiate which VPN should host the additional or the total client devices participating in the conference.

Figure 5B:
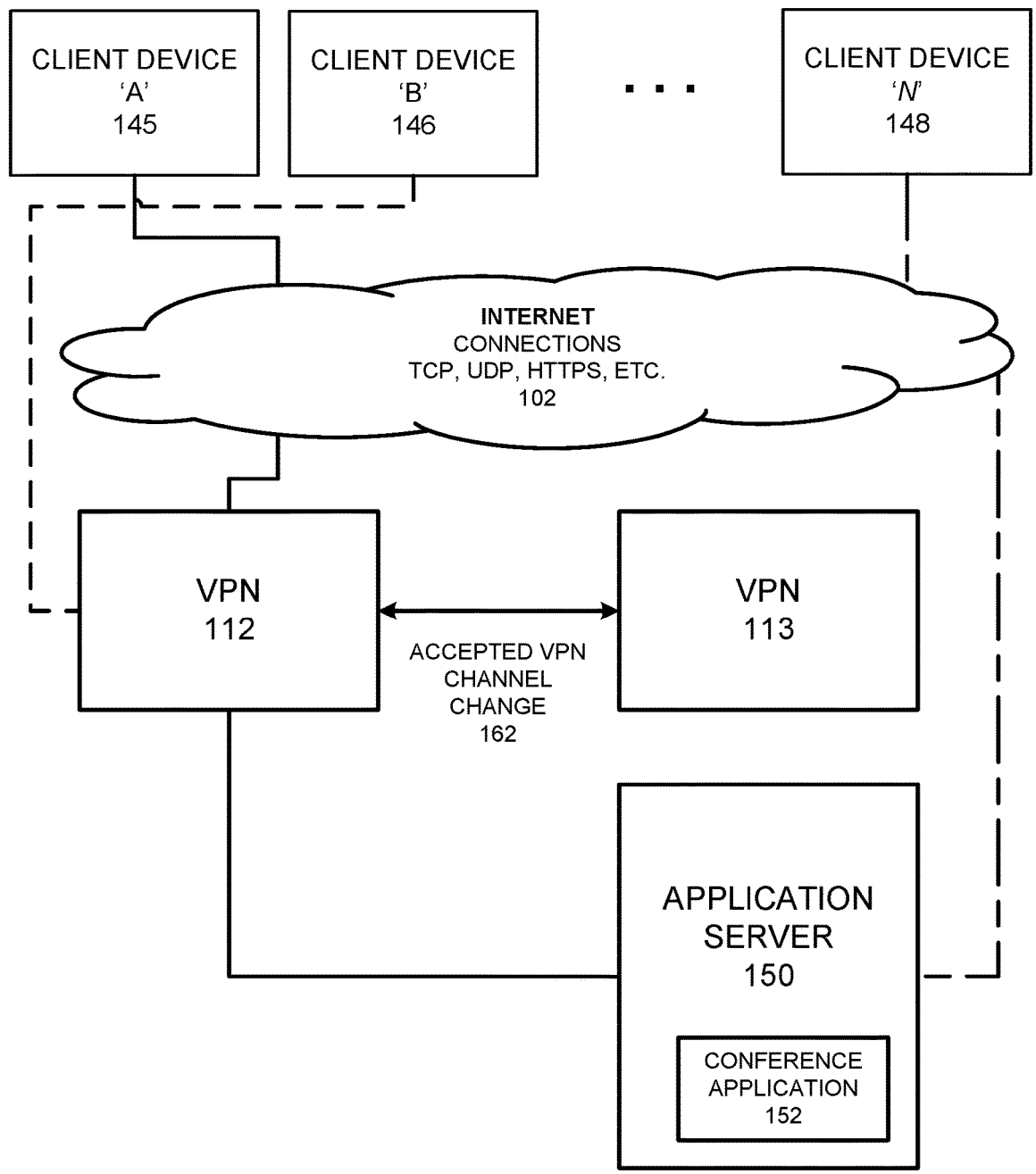
FIG. 5B illustrates an example network configuration of multiple client devices communicating together during a conference with more than one client device utilizing respective VPN servers which are performing an exchange according to example embodiments.

FIG. 5B illustrates an example network configuration of multiple client devices communicating together during a conference with more than one client device utilizing respective VPN servers which are performing an exchange according to example embodiments. Referring to FIG. 5B, the example 550 demonstrates how the VPN-to-VPN negotiations have yielded a result that includes moving the client devices to one VPN 112 based on accepted channel change negotiation messages 162 sent from one VPN to another.

In one example of multiple VPNs having different locations, city 'X' and city 'Y' may have respective VPNs which are part of the same data management application. There could be a VPN-to-VPN instruction, which informs client device 'A' to start using VPN 'Y' and to stop using VPN 'X', and client device 'B' is also on 'X'. One VPN may communicate with the other VPN to take over the conference device data since one has a larger load of client devices and data streams than the other. The decision could be made to have the conference managed by VPN 'Y' not VPN 'X'. Also, another example may include one client device currently on VPN 'X' and one client device currently on VPN 'Y', and an instruction may be generated to go with VPN 'X' after one minute since that is the most optimal VPN available. VPN 'Y' may decide all client devices should use VPN 'X' since 'Y' is not capable of offering as optimal a data service to ensure data success.

The current VPN may be monitoring data between the VPN and the client device, the performance monitoring between client devices 'A' and 'B' may include detecting data paths, monitoring latency, jitter, data rate, packet loss, etc. In this example, device 'A' is on VPN 'X' and device 'B' is on VPN 'Y', so device 'B' could move to VPN 'Z' if this could assist in the current session. All the VPNs are monitored by a central site, but hosting by the VPNs may be performed by VPNs located all over the world. A trigger may be any performance metric on the identified conference call, the decisions made to optimize those preferred clients of the application may include any decision which yields an improvement. One VPN having a single conference attendee may be a better or worse option for other client devices. The locations of the client devices could also be a factor regarding the amount of existing traffic managed by the VPN and whether to switch to a new VPN server.

One example method of operation may include receiving, at a first virtual private network (VPN) server, data from one or more client devices and determining the data includes conference data used to share content during a conference. The process may also include identifying at least one additional VPN server that is available to manage subsequent conference data during the conference, and forwarding instructions to the one or more client devices to use the at least one additional VPN during the conference.

When VPN 'X' makes the decision or is instructed to have VPN 'Y' manage all conference clients, the VPN changeover will be managed by the VPN that is currently connected to one or more of the client devices, in this example VPN 'X'. The current VPN will instruct any current clients to stay or move to another VPN and the instruction will include the new VPN connection and will cause the client device to attempt to establish a new session with the new VPN. The current VPN 'X' can monitor other VPNs for client device and related data management load information, check the connection between the VPNs, and instruct the client device to attempt to connect to another VPN 'Y', and determine whether the connection is optimal by sending a probe communication message and determine the connection status, etc. When the connection yields a positive result of an optimal communication path, then client 'A' sends data to VPN 'X' to inform about the new VPN 'Y'. Client 'A' may then use both connections or one depending on the application setup process and preferences. Also, historical data that is saved by a primary VPN or database may be retrieved to identify the latency and other data signal degradation characteristics of any of the VPNs to ensure a reliable VPN was selected.

Figure 6:
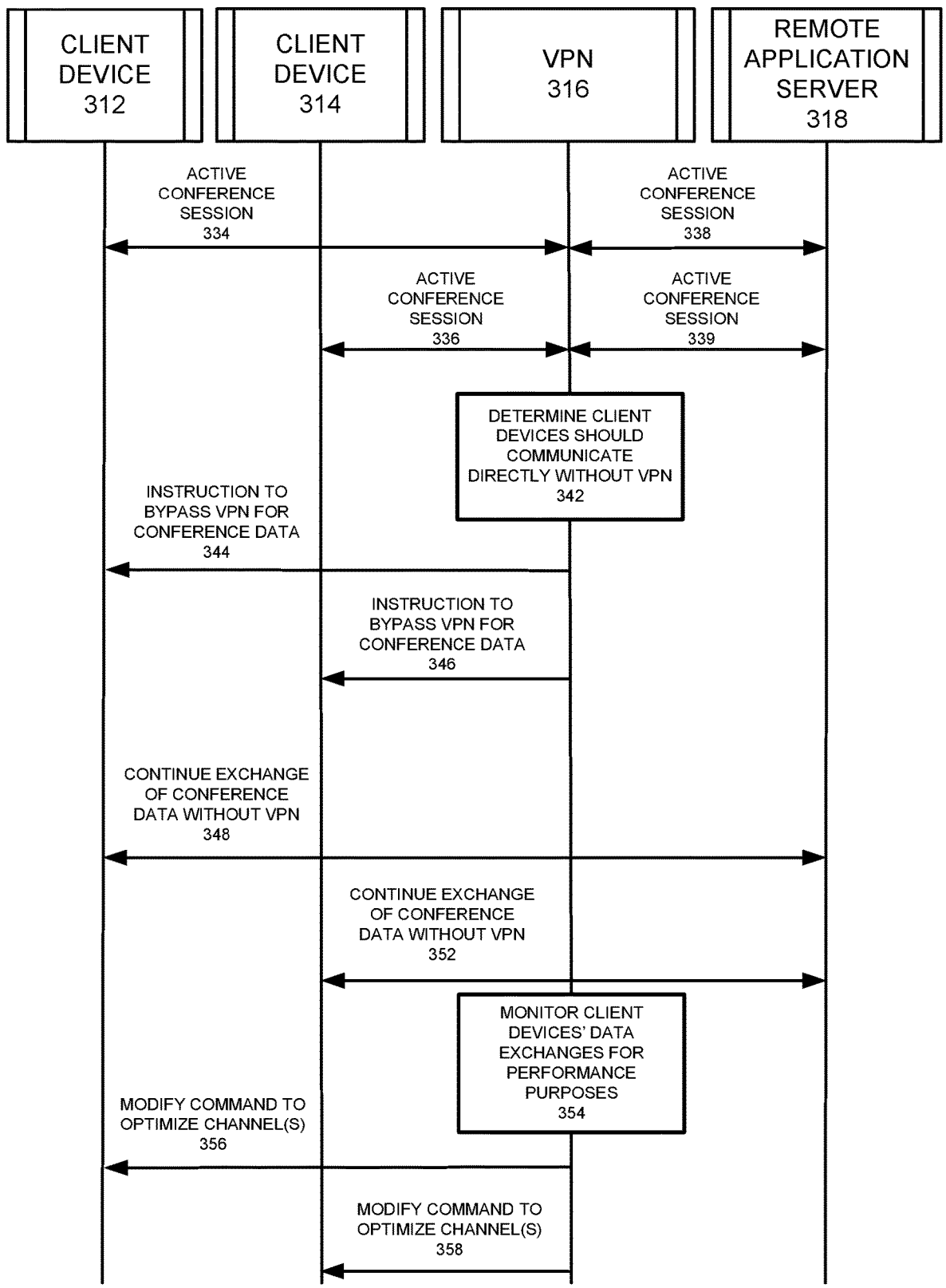
FIG. 6 illustrates an example system diagram of a communication flow between client devices and a VPN for a conference session according to example embodiments.

FIG. 6 illustrates an example system diagram of a communication flow between client devices and a VPN for a conference session according to example embodiments. Referring to FIG. 6, the example 300 includes a first client device 312 and one or more additional client devices 314. The number of client devices in any of the examples of this disclosure include one, two or more client devices. The VPN 316 will manage data transfers for one or more of the client devices as they participate in a collaborative application, such as conferencing (i.e., conference call). In general, the conferencing/client devices 312/314 will be communicating with a remote application server 318 in the cloud which provides the application used by the client devices, such as a conference bridge platform or related application. The VPN 316 will be an intermediary used for data management purposes by subscribing client devices. In some of the examples, not all the client devices are subscribed to the VPN during a conference, and in other examples all of the devices are utilizing the VPN 316 to provide conference data management services.

One example method may include identifying, via a virtual private network (VPN) server 316, a plurality of client devices 312/314 communicating with one another via the VPN server over a respective plurality of network connections 334/336 used during a communication session with the VPN server 316 and during communications 338/339 with a remote server 318. The VPN may determine 342 certain client devices 312/314 which should perform direct communications with one another since they are using the VPN and could be communicating directly. In an effort to bypass the VPN from future communications, the VPN 316 may forward direct communication instructions 344/346 to the plurality of client devices to establish one or more direct tunnels to one another without forwarding inter-client communication data to the VPN server. The VPN may still receive additional data from the plurality of client devices during the communication session after the bypass is performed, and the additional data will not identify any of the client devices as intended recipients of additional data, since that data is going to be shared between client devices directly over their respective Internet connections. However, the VPN 316 may still receive other data, such as Internet browser data request, e-mails, other applications, etc., which can be managed by the VPN 316 on the way to the Internet but not addressed to another client device. Any data intended for another client device for the instructed period of time during the conference will be sent and received between the client devices 312/314 without being sent to the VPN server 316.

The VPN can still perform routing the additional data (not intended to be exchanged between the client devices) to other intended destinations during the conference between the client devices. The client devices can continue exchanging data 348/352 to one another and the remote conference server 318 managing the conference bridge. The VPN can monitor 354 the client devices and manage their data exchanges used during the conference, such as their bit rates, their data channel schemes (e.g., single channel vs. bonded channels, etc.). The instructions may include having both devices modify their channel control 356/358, such as to engage in bonding when data degradation occurs.

The process may also include monitoring the one or more direct tunnels between the client devices to identify the inter-client communication data is optimal, and forwarding instructions to one or more of the client devices to perform one or more channel optimization actions to maintain a threshold level of data communication. The instructions provided by the VPN to the client devices may include a command to perform one or more of channel bonding and channel mirroring with two or more available channels on a single client device. Bonding is combining two channels to have more data capacity and mirroring is sending the same data on two channels for redundancy. The direct communication instructions provided to the plurality of client devices to engage in direct communications may include Internet protocol (IP) addresses of all client devices and port information for each of the client devices to use during the communication session without the VPN. During the initial setup, the process may also include receiving, at the VPN, a first request from a first client device 312 among the plurality of client devices to connect with one or more of the plurality of client devices 314, receiving, at the VPN, a second request from a second client device 314 among the plurality of client devices to connect with one or more of the plurality of client devices, such as 312, and forwarding socket information to the first and second client devices to establish the one or more direct tunnels to one another.

Figure 7:
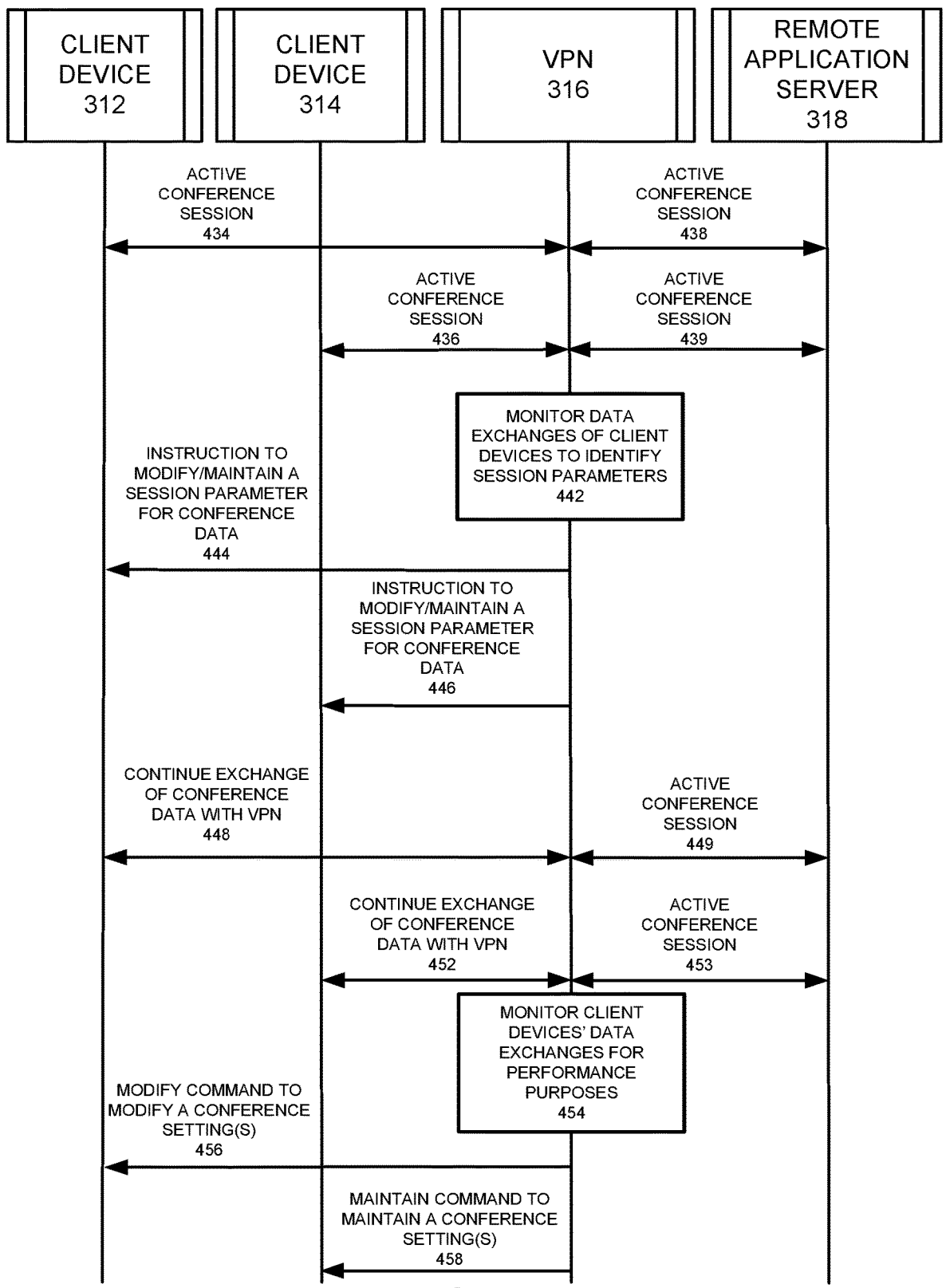
FIG. 7 illustrates an example system diagram of a communication flow between client devices and a VPN configured to modify a conference session according to example embodiments.

FIG. 7 illustrates an example system diagram of a communication flow between client devices and a VPN configured to modify a conference session according to example embodiments. Referring to FIG. 7, the example 400 includes an active conference session 434/436 among a plurality of client devices 312/314 with a VPN 316 and communications 438/439 with a remote application server 318. In this example, the VPN 316 may be monitoring 442 data exchanges between the client devices and the VPN 316 during a conference to identify if any session parameters are exceeding or failing to meet expectations based on predetermined thresholds for any one or more of jitter, latency, packet loss, data rate, etc. When the VPN data management service determines that one or more changes are necessary to optimize data transfers an instruction may be sent to modify/maintain 444/446 a data session between client devices for each of the client devices. One example may be to maintain current conference data settings and parameters for one client device 312 and modify a data rate or perform channel bonding on another device 314. Another example may be to reduce a data rate one device 312 so the data provided to the other device 314 may remain optimal since the device 314 may be identified as having a lower data rate than device 312 so the lower bit rate video/audio, etc., may provide optimization for the lower data rate device 314 and avoid real time communication errors.

After the modifications via the VPN 316, the data may be continued to be exchanged 448/452 with the VPN 316 and exchanged 449/453 with the remote application server 318 which is hosting the conference bridge. After modifying the conference data, the VPN may perform monitoring of the communication session parameters of the one or more client devices which are forwarding the shared content to the VPN server. The VPN server may perform determining whether the modified one or more communication session parameters have increased a performance of the one or more other client devices during subsequent content sharing between the one or more client devices. This may be performed by additional monitoring of the client device exchanges 454. The VPN 316 may perform additional modifying by submitting additional modify commands to one or more of the client devices 312/314 to modify 456 a setting of a client device that is either underperforming data communication standards, or is assisting another client device by modifying its current communication data parameters. Also, the other client device may maintain its communication settings 458 if no changes are necessary to maintain optimal communication settings.

The process may also include responsive to the monitoring, identifying the communication session parameters indicate that one or more of the client devices are operating below one or more communication session parameter thresholds. The one or more communication session parameter thresholds comprise one or more of a data rate, a packet loss rate, an audio data rate, a video data rate, a jitter value, and a latency value. The process may further include modifying the one or more of the communication session parameters by modifying one or more of an audio data rate and a video data rate of one client device. The process may further include modifying the one or more of the communication session parameters by bonding a single channel with one or more additional channels used by one client device during a time period of a detected increase in one or more of an audio data rate and a video data rate. The increase may be caused by a change in data rate for content shared by the client device or by a change in a data rate by another client device. Other changes may include increases or decreases in threshold data session parameters which may exceed or drop below one or more threshold levels. The process may further include decreasing one or more of an audio data rate and a video data rate of one or more active conference devices which are not currently content sharing to optimize the data delivery to and from those devices.

Figure 8:
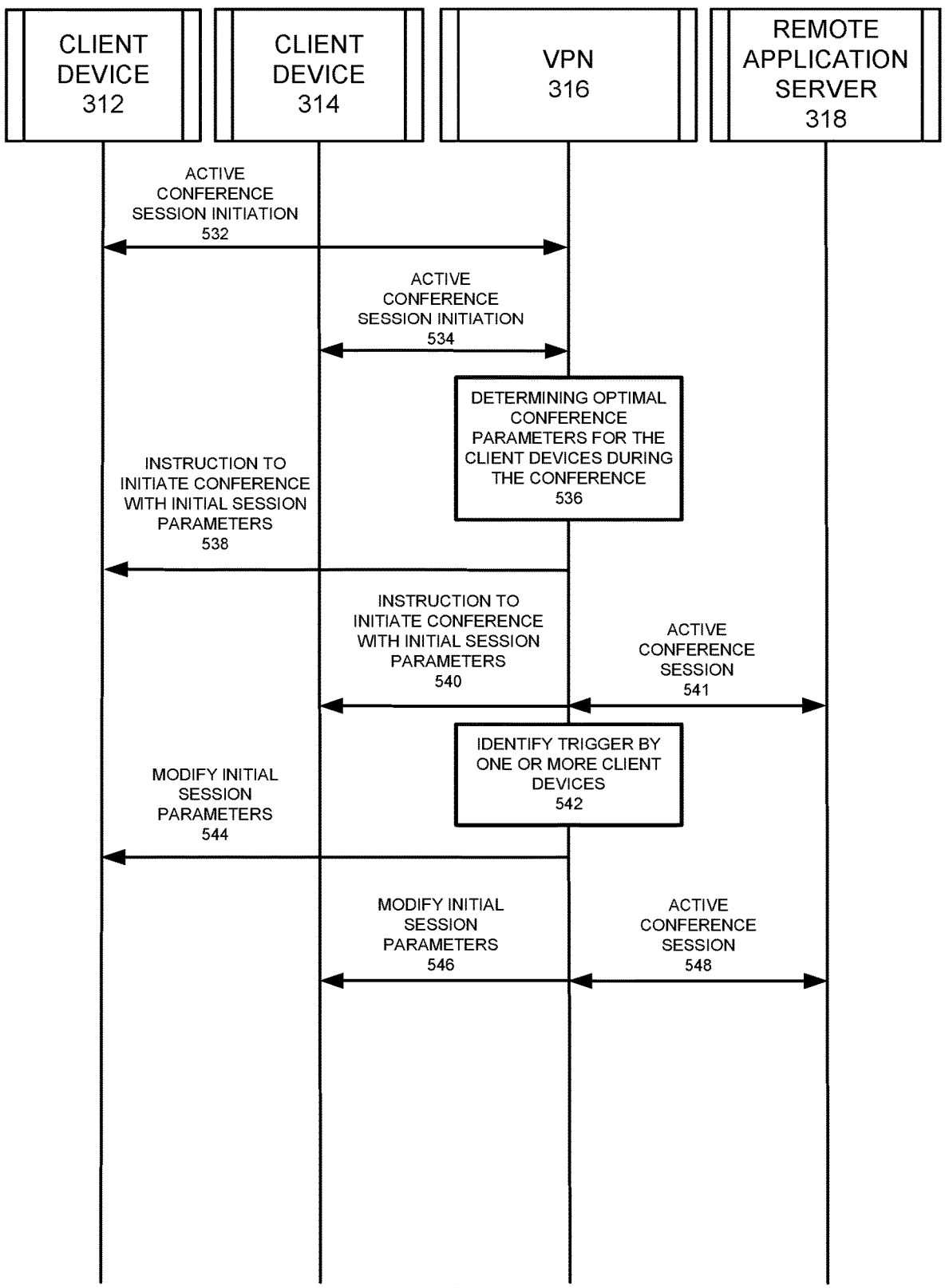
FIG. 8 illustrates an example system diagram of a communication flow between client devices and a VPN configured to modify initial session parameters for a conference session according to example embodiments.

FIG. 8 illustrates an example system diagram of a communication flow between client devices and a VPN configured to modify initial session parameters for a conference session according to example embodiments. Referring to FIG. 8, the example 500 includes an active conference session 532/534 among a plurality of client devices 312/314 with a VPN 316. In this example, the VPN is managing a conference for multiple client devices and performing resource balancing for all client devices' optimal communication experience. The process may include receiving, at a virtual private network (VPN) server, a plurality of conference confirmations from a plurality of client devices, and determining initial optimal conference settings 536, forwarding, via the VPN server 316, a first set of conference parameters to a plurality of client devices 312/314 participating on the conference and instructions 538/540 to initiate the conference with the identified settings. The conference session may then be initiated with those settings between the client devices, the VPN and the remote server 318 which hosts the conference application. The process may further include identifying a conference action trigger 542 performed by one or more of the client devices, and performing a conference data managing (CDM) action to modify 544 one or more of the first set of conference parameters of the one or more client devices responsive to the conference action trigger. The first set of conference parameters include one or more of an initial video data rate and an initial audio data rate. A modification 546 may be made to the other conference devices to assist the initial conference device or to prevent the initial conference device from reducing the quality of conference data at the other conference device(s). After the changes are made the conference session may be resumed 548.

The process may further include modifying the one or more of the first set of conference parameters by assigning one or more of a lower video data rate and a lower audio data rate to one of the plurality of client devices and maintaining the first set of conference parameters for another one of the plurality of conference client devices. The process may further include modifying the one or more of the first set of conference parameters by assigning one or more of a higher video data rate and a higher audio data rate to one of the plurality of client devices and maintaining the first set of conference parameters for another one of the plurality of conference client devices. The process may further include identifying a conference action trigger performed by one or more of the client devices by determining one or more of the client devices initiated: one or more of a video and an audio sharing function, a change in the data rate used during the conference, and one or more of a jitter or latency threshold being exceeded. The CDM action may include bonding two or more channels of a single one of the plurality of client devices together as a combined communication channel. The CDM action may include bonding two or more channels for each of two or more of the plurality of client devices as combined communication channels.

Figure 9:
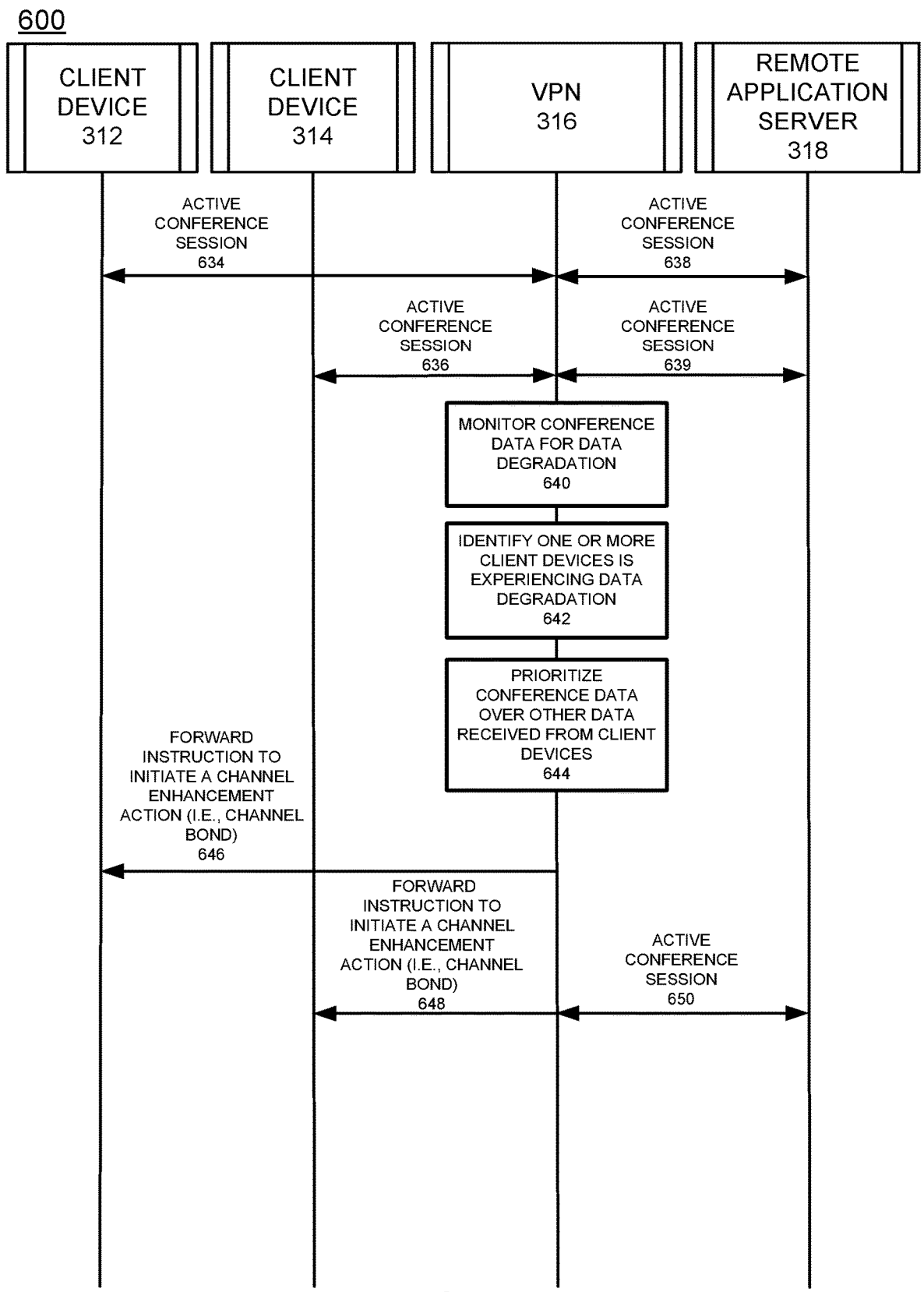
FIG. 9 illustrates an example system diagram of a communication flow between client devices and a VPN configured to prioritize conference session data for a conference session according to example embodiments.

FIG. 9 illustrates an example system diagram of a communication flow between client devices and a VPN configured to prioritize conference session data for a conference session according to example embodiments. Referring to FIG. 9, the example 600 includes an active conference session 634/636 among a plurality of client devices 312/314 with a VPN 316 and communications 638/639 with a remote application server 318. The process of prioritization of conference data via a VPN 316 and managing the conference data may include receiving, at a virtual private network (VPN) server 316, data from one or more client devices, monitoring conference data for data degradation 640, identifying one or more client devices is experiencing data degradation 642 and prioritizing conference data over other data received from client devices 644. The process may further include determining the data includes conference data used to share content during a conference, prioritizing the conference data to have a higher priority than other portions of the data received from the one or more client devices, forwarding instructions to the one or more client devices to bond 646/648 two or more communication channels between the VPN server and each of the one or more client devices, and receiving the prioritized conference data over the bonded communication channels and continuing the conference session 650.

The process may further include monitoring the data to identify data degradation for the one or more client devices, identifying one or more of the client devices is experiencing data degradation during the conference, and responsive to the identified data degradation, performing the prioritizing and the bonding. The process may further include identifying the conference data, via the VPN, by data packet monitoring and determining via the data packet monitoring that the data includes conference data that is assigned to a conference application and non-conference data that is assigned to one or more non-conference applications. The process may further include forwarding data management instructions to the one or more client devices to route the data assigned to the one or more non-conference applications via a first channel of the two or more channels. The first channel may include a slower data rate than other available channels.

Figure 10:
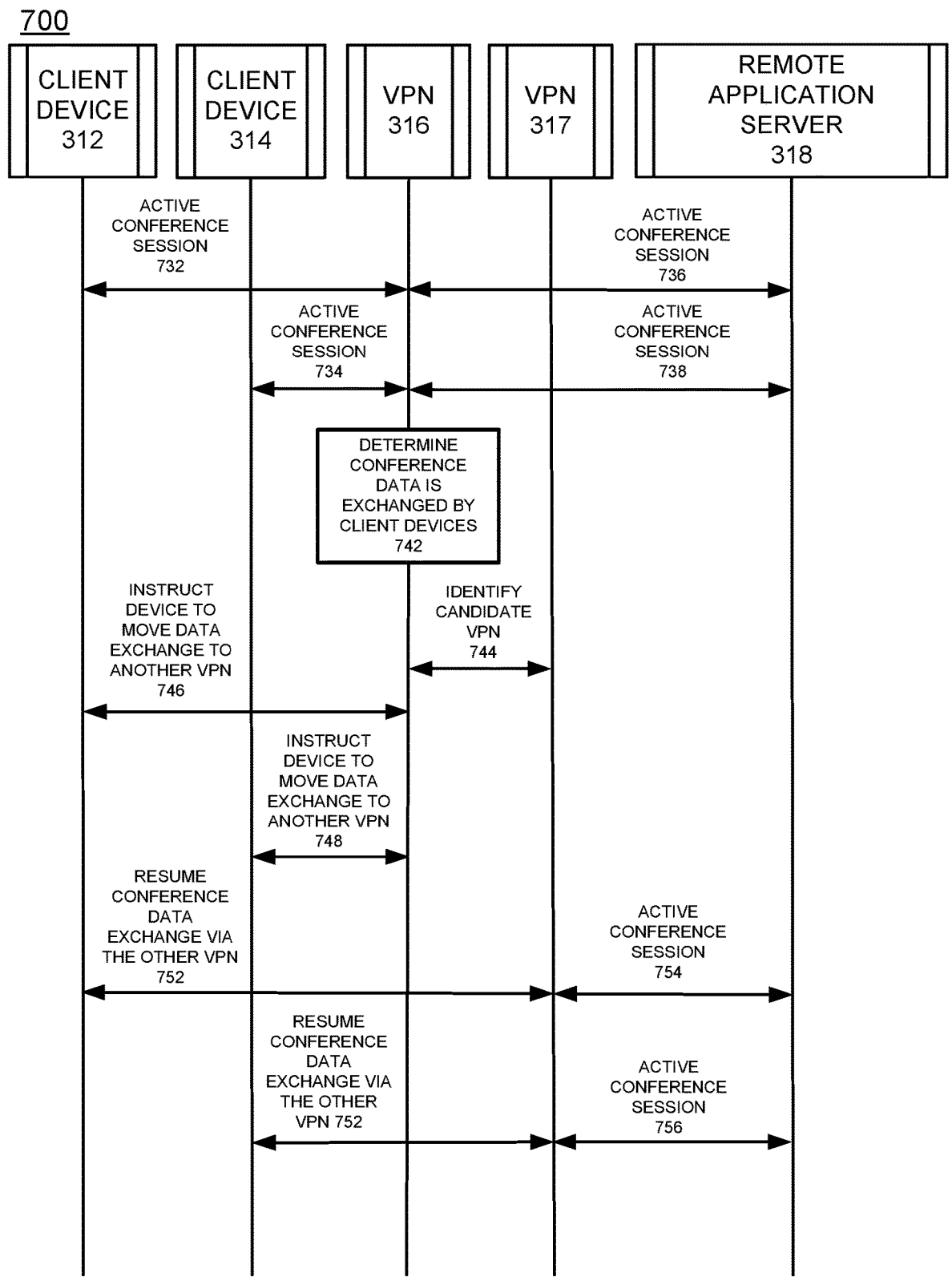
FIG. 10 illustrates an example system diagram of a communication flow between client devices and multiple VPNs configured to manage data for a conference session according to example embodiments.

FIG. 10 illustrates an example system diagram of a communication flow between client devices and multiple VPNs configured to manage data for a conference session according to example embodiments. Referring to FIG. 10, the example 700 includes an active conference session 732/734 among a plurality of client devices 312/314 with a VPN 316 and communications 736/738 with a remote application server 318. In this example, there are more than one VPN 316/317 available to manage the conference data among the client devices. The VPN to VPN management for conferencing clients may include receiving, at a first virtual private network (VPN) server, data from one or more client devices, determining the data includes conference data used to share content during a conference 742, identifying at 744 least one additional VPN server 317 that is available to manage subsequent conference data during the conference, and forwarding instructions 748 to the one or more client devices to use the at least one additional VPN during the conference.

The process may further include monitoring the conference data to identify an amount of conference data used by the first VPN server, and determining a threshold amount of conference data is being used by the first VPN server, and responsive to the threshold amount of conference data being used by the first VPN server, designating the at least one additional VPN to receive the subsequent conference data during the conference. Identifying at least one additional VPN server includes determining the at least one additional VPN server is not currently receiving the conference data. The process may further include forwarding the conference data of at least one of the one or more client devices to the at least one additional VPN server, and receiving non-conference data of one of the one or more client devices at the first VPN server. The process may further include forwarding the conference data of at least one of the one or more clients to the at least one additional VPN server, and receiving non-conference data of all of the one or more client devices at the first VPN server. The process may further include forwarding a request from the first VPN server to the at least one additional VPN server to receive the subsequent conference data from the one or more client devices at the at least one additional VPN server, and receiving subsequent non-conference data at the first VPN server.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Figure 11:
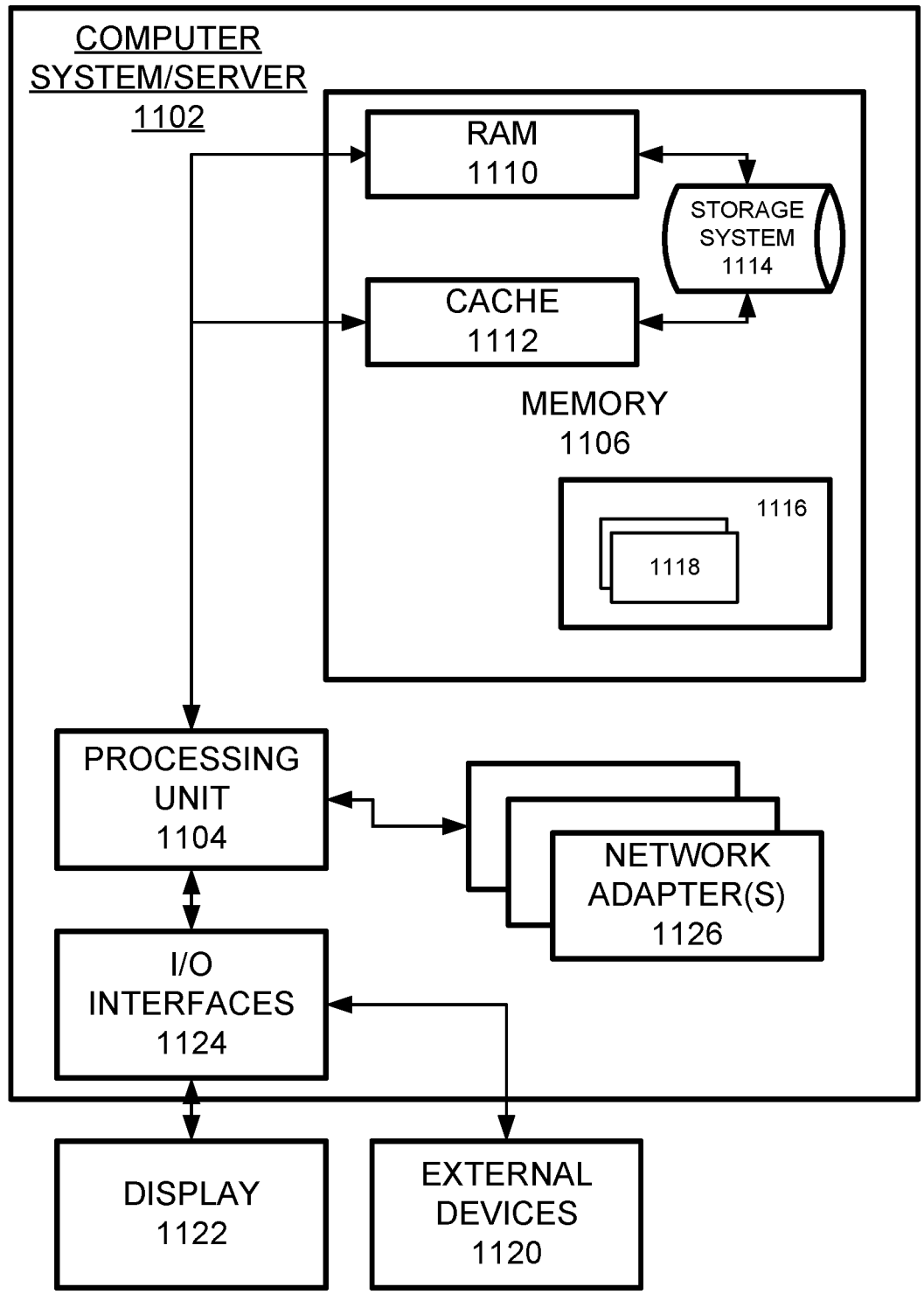
FIG. 11 illustrates an example network entity device configured to store instructions, software, and corresponding hardware for executing the same according to example embodiments.

FIG. 11 illustrates an example network entity device configured to store instructions, software, and corresponding hardware for executing the same according to example embodiments. FIG. 11 is not intended to suggest any limitation as to the scope of use or functionality of embodiments of the application described herein. Regardless, the computing node 1100 is capable of being implemented and/or performing any of the functionality set forth hereinabove.

In computing node 1100 there is a computer system/server 1102, which is operational with numerous other general purpose or special purpose computing system environments or configurations. Examples of well-known computing systems, environments, and/or configurations that may be suitable for use with computer system/server 1102 include, but are not limited to, personal computer systems, server computer systems, thin clients, rich clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1102 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 1102 may be practiced in distributed cloud computing environments where tasks are performed by remote processing devices that are linked through a communications network. In a distributed cloud computing environment, program modules may be located in both local and remote computer system storage media including memory storage devices.

As displayed in FIG. 11, computer system/server 1102 in cloud computing node 1100 is displayed in the form of a general-purpose computing device. The components of computer system/server 1102 may include, but are not limited to, one or more processors or processing units 1104, a system memory 1106, and a bus that couples various system components including system memory 1106 to processor 1104.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1102 typically includes a variety of computer system readable media. Such media may be any available media that is accessible by computer system/server 1102, and it includes both volatile and non-volatile media, removable and non-removable media. System memory 1106, in one embodiment, implements the flow diagrams of the other figures. The system memory 1106 can include computer system readable media in the form of volatile memory, such as random-access memory (RAM) 1110 and/or cache memory 1112. Computer system/server 1102 may further include other removable/non-removable, volatile/non-volatile computer system storage media. By way of example only, storage system 1114 can be provided for reading from and writing to a non-removable, non-volatile magnetic media (not displayed and typically called a "hard drive"). Although not displayed, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 1106 may include at least one program product having a set (e.g., at least one) of program modules that are configured to carry out the functions of various embodiments of the application.

Program/utility 1116, having a set (at least one) of program modules 1118, may be stored in memory 1106 by way of example, and not limitation, as well as an operating system, one or more application programs, other program modules, and program data. Each of the operating system, one or more application programs, other program modules, and program data or some combination thereof, may include an implementation of a networking environment. Program modules 1118 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 1102 may also communicate with one or more external devices 1120 such as a keyboard, a pointing device, a display 1122, etc.; one or more devices that enable a user to interact with computer system/server 1102; and/or any devices (e.g., network card, modem, etc.) that enable computer system/server 1102 to communicate with one or more other computing devices. Such communication can occur via I/O interfaces 1124. Still yet, computer system/server 1102 can communicate with one or more networks such as a local area network (LAN), a general wide area network (WAN), and/or a public network (e.g., the Internet) via network adapter(s) 1126. As depicted, network adapter(s) 1126 communicates with the other components of computer system/server 1102 via a bus. It should be understood that although not displayed, other hardware and/or software components could be used in conjunction with computer system/server 1102. Examples include, but are not limited to: microcode, device drivers, redundant processing units, external disk drive arrays, RAID systems, tape drives, and data archival storage systems, etc.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising
    determining, via a virtual private network (VPN) server, one or more client devices are currently content sharing during a conference comprising a plurality of active client devices;
    monitoring, via the VPN server, communication session parameters of one or more of the client devices which are forwarding the shared content to the VPN server, wherein the shared content is destined for one or more of the other client devices;
    modifying, via the VPN server, one or more of the communication session parameters of the one or more client devices which are forwarding the shared content to the VPN server; and
    determining whether the modified one or more communication session parameters have increased a performance of the one or more other client devices.

2. The method of claim of claim 1, comprising
    responsive to the monitoring, identifying the communication session parameters indicate that one or more of the client devices are operating below one or more communication session parameter thresholds.

3. The method of claim 2, wherein the one or more communication session parameter thresholds comprise one or more of a data rate, a packet loss rate, an audio data rate, a video data rate, a jitter value, and a latency value.

4. The method of claim 1, wherein the modifying the one or more of the communication session parameters comprises modifying one or more of an audio data rate and a video data rate of one client device.

5. The method of claim 1, wherein the modifying the one or more of the communication session parameters comprises bonding a single channel with one or more additional channels used by one client device during a time period of a detected increase in one or more of an audio data rate and a video data rate.

6. The method of claim 1, comprising
    decreasing one or more of an audio data rate and a video data rate of one or more of active conference devices which are not currently content sharing.

7. The method of claim 1, wherein the determining whether the modified one or more communication session parameters have increased a performance of the one or more other client devices comprises performing the determining during subsequent content sharing between the one or more client devices.

8. A virtual private network (VPN) server comprising
    a processor configured to
        determine one or more client devices are currently content sharing during a conference comprising a plurality of active client devices;
        monitor communication session parameters of one or more of the client devices which are forwarding the shared content to the VPN server, wherein the shared content is destined for one or more of the other client devices;

modify one or more of the communication session parameters of the one or more client devices which are forwarding the shared content to the VPN server; and determine whether the modified one or more communication session parameters have increased a performance of the one or more other client devices.

9. The VPN server of claim of claim 8, wherein the processor is further configured to responsive to the monitoring, identify the communication session parameters indicate that one or more of the client devices are operating below one or more communication session parameter thresholds.

10. The VPN server of claim 9, wherein the one or more communication session parameter thresholds comprise one or more of a data rate, a packet loss rate, an audio data rate, a video data rate, a jitter value, and a latency value.

11. The VPN server of claim 8, wherein the one or more of the communication session parameters comprises is modified to include one or more of an audio data rate and a video data rate of one client device.

12. The VPN server of claim 8, wherein the one or more of the communication session parameters is modified to include the processor being configured to bond a single channel with one or more additional channels used by one client device during a time period of a detected increase in one or more of an audio data rate and a video data rate.

13. The VPN server of claim 8, wherein the processor is further configured to decrease one or more of an audio data rate and a video data rate of one or more of active conference devices which are not currently content sharing.

14. The VPN server of claim 8, wherein the determining of whether the modified one or more communication session parameters have increased a performance of the one or more other client devices comprises the processor being configured to determine during subsequent content sharing between the one or more client devices.

15. A non-transitory computer readable storage medium configured to store instructions that when executed causes a processor to perform:

determining, via a virtual private network (VPN) server, one or more client devices are currently content sharing during a conference comprising a plurality of active client devices;

monitoring, via the VPN server, communication session parameters of one or more of the client devices which are forwarding the shared content to the VPN server, wherein the shared content is destined for one or more of the other client devices;

modifying, via the VPN server, one or more of the communication session parameters of the one or more client devices which are forwarding the shared content to the VPN server; and determining whether the modified one or more communication session parameters have increased a performance of the one or more other client devices.

16. The non-transitory computer readable storage medium of claim 15, wherein the processor is further configured to perform:

responsive to the monitoring, identifying the communication session parameters indicate that one or more of the client devices are operating below one or more communication session parameter thresholds.

17. The non-transitory computer readable storage medium of claim 16, wherein the one or more communication session parameter thresholds comprise one or more of a data rate, a packet loss rate, an audio data rate, a video data rate, a jitter value, and a latency value.

18. The non-transitory computer readable storage medium of claim 15, wherein the modifying the one or more of the communication session parameters comprises modifying one or more of an audio data rate and a video data rate of one client device.

19. The non-transitory computer readable storage medium of claim 15, wherein the modifying the one or more of the communication session parameters comprises bonding a single channel with one or more additional channels used by one client device during a time period of a detected increase in one or more of an audio data rate and a video data rate.

20. The non-transitory computer readable storage medium of claim 15, wherein the processor is further configured to decrease one or more of an audio data rate and a video data rate of one or more of active conference devices which are not currently content sharing.

* * * * *